United States Patent Office 3,717,224
Patented Feb. 20, 1973

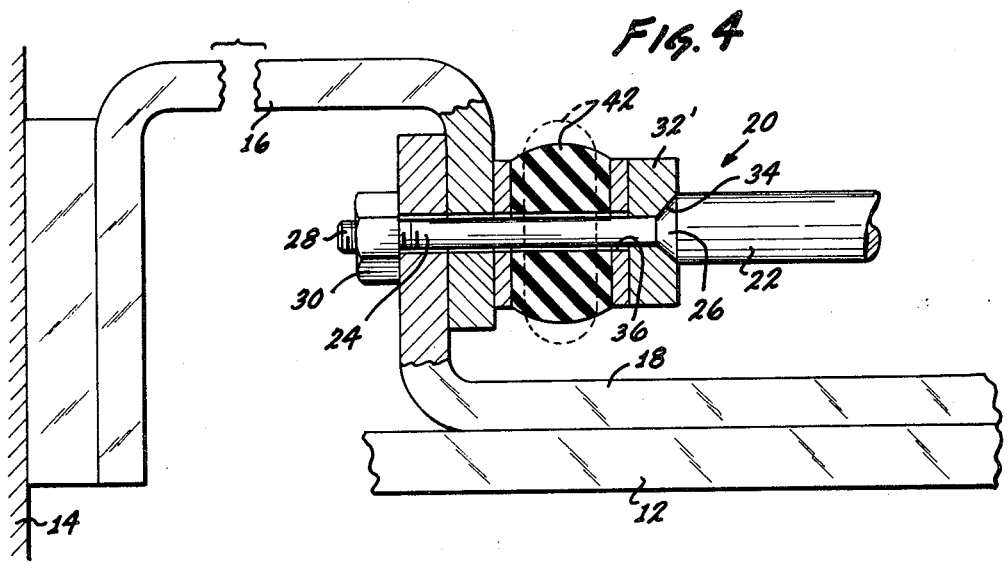
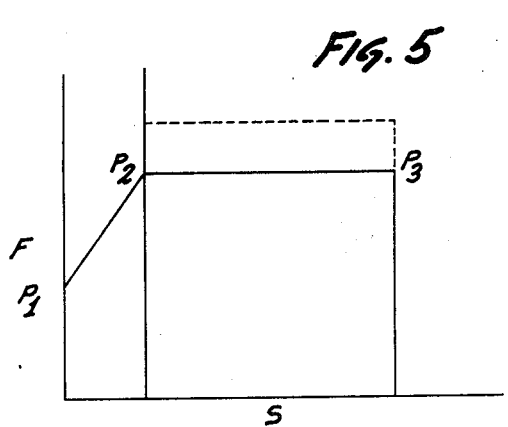
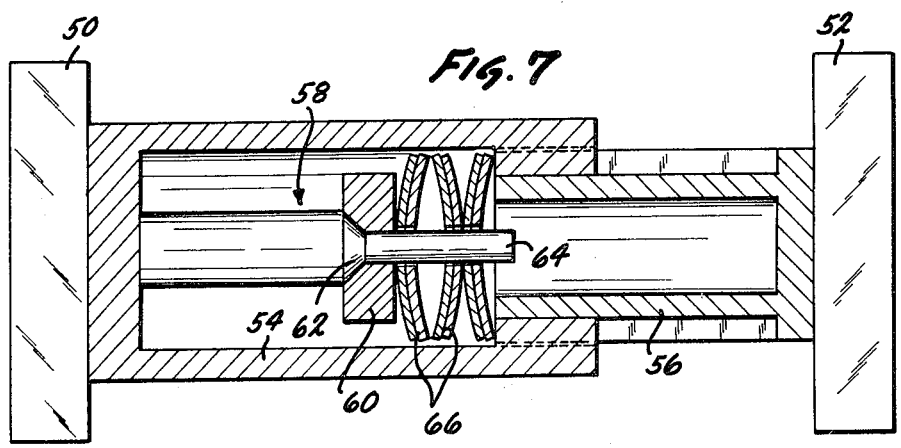

3,717,224
TWO STAGE ENERGY ABSORBER
Austin F. Leach, Portland, and Gary Karl Sandberg, Aloha, Oreg., assignors to Omark Industries, Inc., Portland, Oreg.
Filed Nov. 15, 1971, Ser. No. 198,760
Int. Cl. F16f 7/12
U.S. Cl. 188—1 C           3 Claims

ABSTRACT OF THE DISCLOSURE

A device for absorbing energy wherein two members are bolted together, said device adapted to absorb energy when one of the members receives an impact urging separation of the members. A resilient pad in the form of a thick elastomeric washer on the bolt absorbs minor impact and a die through which a drawable portion on the bolt is drawn absorbs severe impact.

HISTORY

This invention relates to energy absorption devices and particularly such devices used to absorb the impact of a moving object, for example, an automobile striking a barrier or another automobile. Severe losses as a result of automobile damage and personal injury are caused by such automobile impacts. It is recognized that such losses can be significantly reduced by appropriate energy absorption. Many forms of energy absorption devices have been conceived for placement between the automobile bumper and the automobile body to absorb or partly absorb impact. Generally these devices are of two types. A first type is one which is automatically reset, i.e., upon impact it returns to its original position and is able to absorb impact of a very low magnitude, but are very expensive if required to absorb significant impact, e.g., an automobile hitting a solid barrier at more than 5 miles per hour. The second type is able to absorb only one impact, i.e., it is consumed or destroyed in the process of absorbing energy. However, the latter type can maintain a simple and inexpensive design while absorbing much higher impacts than the resetting devices. Both types have advantages that are highly desirable for absorbing energy and both have defects that are undesirable. The present invention is believed to provide a device which combines the desirable features of both types, while avoiding most of the undesirable features.

Very briefly, in a preferred form of the invention, two brackets from the automobile body and bumper frame are fastened together with a bolt which bolt is provided with an increased or drawable portion and a die washer. Between the die and bracket or between the head of the bolt and bracket is provided a thick pad. The drawable shank portion of the bolt is designed to resist drawing until the elastomeric pad is collapsed. Thus it will be understood that small impacts on the automobile may be absorbed within the limits of the elastomeric pad with the brackets bolt and die returned to their original position and the elastomeric pad returned to its original shape. Upon receiving a severe impact exceeding the limits of the elastomeric pad, the drawable portion of the bolt is drawn through the die washer resulting in very high absorption of energy. The invention will be more clearly understood by reference to the following detailed description and drawings wherein FIG. 1 illustrates an automobile having a bumper incorporating the device of the present invention;

FIG. 4 is a view similar to FIG. 2 but illustrating a second form of the invention;

FIG. 5 is a graph depicting absorption of energy of a device of the present invention;

FIG. 6 illustrates a further embodiment of the invention and

FIG. 7 illustrates a still further embodiment of the invention.

Figure 1:
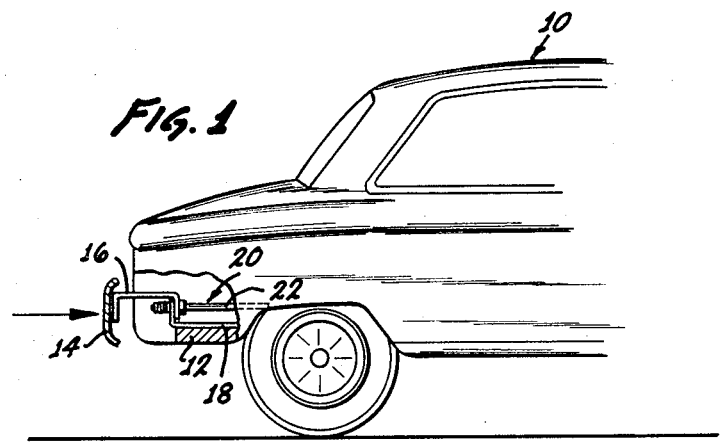
Figure 2:
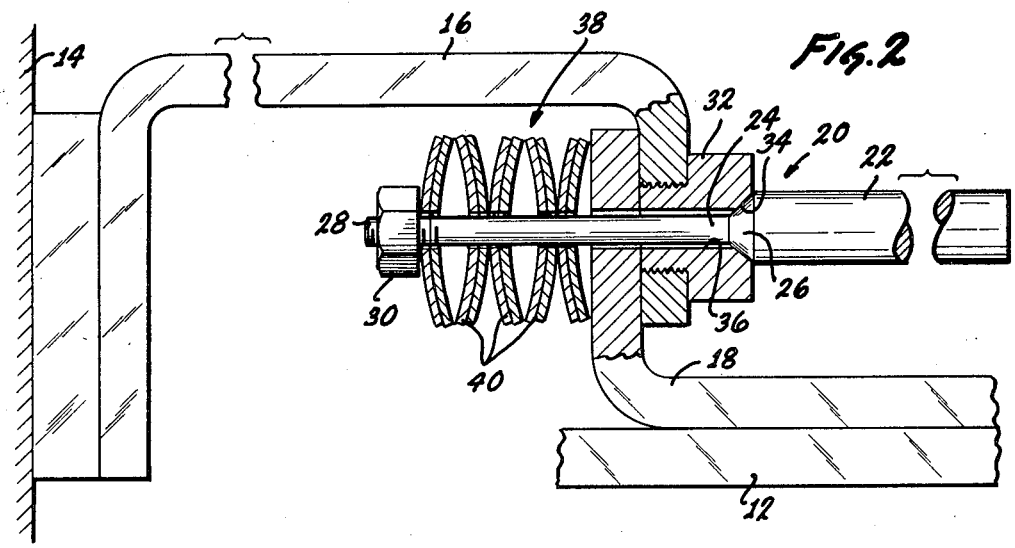
FIG. 2 is an enlarged view of one form of the two part device of the present invention incorporated in FIG. 1.
Figure 3:
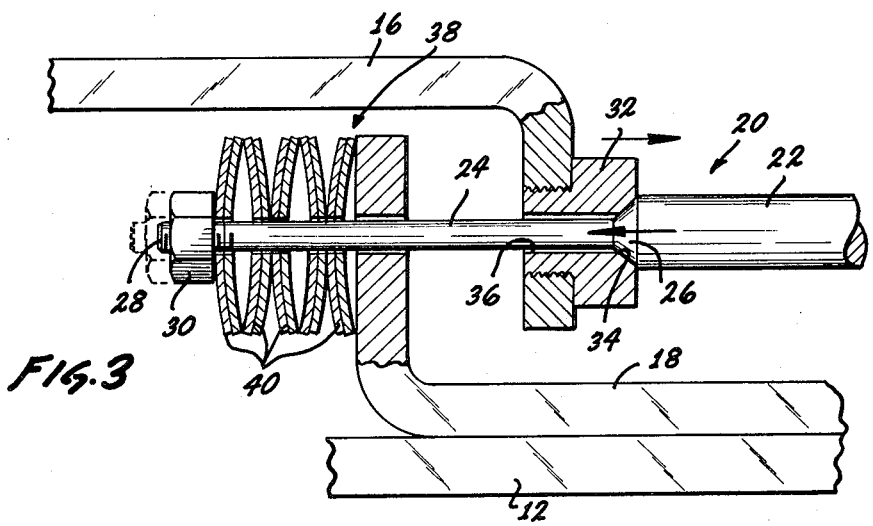
FIG. 3 is a view similar to FIG. 2 but showing the energy absorption device after the automobile has received a severe impact.

Referring to FIGS. 1 through 3, an automobile 10 including a body frame 12 and bumper 14 has an energy absorption device fastening a bracket 16 of the bumper 14 to a bracket 18 of the body frame 12. The energy absorption device includes a rod or bolt 20 which has a drawable section 22 and a reduced section 24 interconnected by a tapered section 26. Screw threads 28 on the end of the reduced section of the bolt are engaged by a nut 30. A die member 32 is threadably engaged with a threaded opening in the bracket 16 of the bumper 14. A tapered opening 34 in the die member 32 is adapted to mate with the tapered section 26 of the bolt. As will be noted, the reduced section of the bolt passes through the die member 32 and through an aligned opening 36 in bracket 18 of frame 12. Biasing means 38 between the bracket 18 and nut 30 is comprised of spring washers 40.

Referring now to FIG. 3 it will be understood that upon the bumper 14 receiving an impact the brackets 18 and 16 will be urged apart. Initially the spring washers 40 will be collapsed and as previously explained if the limits are not exceeded the brackets will be urged back together when the impact is relieved. However, when receiving an impact in excess of perhaps 5 to 10 miles per hour the energy absorption limits of the spring washers will be exceeded and further separation of the brackets will cause drawing of the drawable portion 22 of the bolt 20 through the die 32. It will be understood that the brackets are returned to a tight fit by tightening the nut 30 if only partial drawing has resulted with sufficient screw threads 28 remaining so as to permit tightening; otherwise the bolt 20 will have to be replaced. This, of course can be accomplished by merely removing the nut 30. It is pointed out that the tight fit of the brackets will be enhanced by placing the resilient member e.g., the spring member 40 in some compression to maintain a constant urging of the brackets in close fitting engagement.

FIG. 4 is an illustration of a further embodiment of the invention wherein the resilient member, i.e., the spring washer 40, is replaced with an elastomeric pad 42. A further change is in the placement of the resilient member between the brackets and the die as opposed to between the brackets and the nut as shown in FIGS. 2 and 3. In this structure the die 32 is in the form of a washer-like member and contains no threads for securing the same to the bracket 16. In every other respect the embodiment is the same as that previously described.

FIG. 5 illustrates the energy absorption curve of the two part device of the present invention. P1 on the F axis of the curve represents the force received by the bumper which begins collapsing the resilient member. As shown by the curve, the resistive force characteristic of a resilient member increases as it is compressed until the point P2 is reached, at which point the compressive limit of the resilient member is reached and the drawable rod begins drawing through the die member. The flat curve shown between points P2 and P3 illustrates the constant resistive force of the rod being drawn through the die. It will be understood that numerous variations are available to produce different force resisting curves. For example, such is possible by varying the hardness of the rod, the difference in diameters between the drawable diameter and the opening in the die member, different materials, tapering the drawable portion, etc. It is a simple matter in most instances to design the two part member of the present invention to satisfy the particular curve functions desired.

FIG. 6 illustrates the manner of applying the elastomeric pad of FIG. 4 to the specific arrangement of parts shown in FIG. 2. The similar numbers used in FIG. 4 will assist the reader in understanding the similarities.

FIG. 7 illustrates the still further application of the two part energy absorption concept. Thus rather than holding two brackets together for absorbing energy, two members are held apart. Thus member 50 illustrating an automobile frame and member 52 illustrating a bumper, a column 54 functions as a sleeve which telescopes over the column 56 affixed to the bumper 52. It will be understood that complete separation of the members 50 and 52 are prevented by any one of a number of fastening devices. An energy absorbing rod 58 is positioned within the large column 54. A die washer 60 is abutted against a mating tapered portion 62 of the rod with a reduced portion 64 extended through spring washers 66. It will be understood that as members 50 and 52 are forced together compression of spring washer 66 will take place. When the spring washers are fully collapsed, free passage of the rod into column 56 is prevented by the die washer 60 abutted against the washers which in turn are butted against the end of column 56. Further compression of the members 50 and 52 forces drawing of the rod 58 through the die washer 60.

Numerous other variations will be apparent to those skilled in the art. Thus the present invention is limited only by the scope of the appended claims.

What is claimed is:

1. A two stage energy absorption device including a rod having a drawable section, a reduced section, and an intermediate tapered section, a die member mounted on the reduced section and having a tapered entry mated with and abutted against the tapered section of the rod, a resilient member between the free end of the reduced section and the die member, and clamping means to clamp a pair of brackets and the resilient member tightly against the die member.

2. A two stage energy absorption device as defined in claim 1 wherein the clamping means is comprised of screw threads on the free end of the reduced section of rod and a nut threadably engaged with the screw threads for clamping and establishing a preload on the resilient member.

3. A two stage energy absorption device as defined in claim 2 wherein the screw threads are provided on the reduced portion of the rod a substantial portion of its length to enable repeated tightening of the nut when only a portion of the drawable section of the rod is drawn following impact.

References Cited
UNITED STATES PATENTS

| | | | |
|---|---|---|---|
| 2,555,436 | 6/1951 | Druilhet | 188—1 C UX |
| 3,082,846 | 3/1963 | Jensen et al. | 188—1 C |
| 3,432,200 | 3/1969 | Barton | 293—71 R |
| 3,437,367 | 4/1969 | Blank | 188—1 C X |

DUANE A. REGER, Primary Examiner

U.S. Cl. X.R.

293—88